United States Patent Office

2,943,073
Patented June 28, 1960

2,943,073

SULFUR-VULCANIZABLE RUBBER COMPOSITION

John C. Brantley, Buffalo, N.Y., assignor to Union Carbide Corporation, a corporation of New York No Drawing. Filed Feb. 20, 1959, Ser. No. 794,527

17 Claims. (Cl. 260—41.5)

The invention relates to a process and compositions useful in the vulcanization of natural and synthetic rubbers. It includes correlated improvements and discoveries whereby curing of rubber is augmented. It will be understood that the term "rubber," as used herein throughout the specification and claims, includes both natural and synthetic rubbers.

Raw rubber, whether natural or synthetic, is suitable for only relatively few purposes. For most types of service the rubber must be compounded with various materials which tend to increase the hardness, stiffness, strength, and resistance to abrasion, tearing and cutting.

Sulfur is added for curing or vulcanization. Natural rubber and any synthetic rubber which is sulfur-vulcanizable may be employed in the practice of this invention. Such synthetic rubbers include, but are not limited to, the butadiene-styrene copolymers such as Polysar Krylene, Krynol 651 and Krynol 652, manufactured by Polymer Corporation, Ltd. and domestically distributed; the butadiene-acrylonitrile copolymers, such as those sold by B. F. Goodrich Chemical Co. and designated Hycar 1041, 1042, 1043 and 1014 (listed in order of decreasing acrylonitrile content), and Hycar 1072, which is carboxyl-containing and has medium-high acrylonitrile content; the butadiene-methyl vinylpyridine copolymers, such as the Phillips Chemical Co. Philprene VP-25, a 75–25 butadiene-2-methyl-5-vinylpyridine copolymer; the chloroprene rubbers, such as DuPont's neoprene types AC, CG, and WHV; the polyisobutylene rubbers, including Enjay Butyl, a copolymer of isobutylene with a small proportion of isoprene, available from the Enjay Co., Inc., and Hycar 2202, a modified (brominated) polymer, made by B. F. Goodrich Chemical Co.; an organopolysiloxane elastomer gum stock containing a vinyl group attached to each of about 0.3% of the silicon atoms, and sold by Union Carbide Corporation as W–96 gum stock.

Curing accelerators, such as benzothiazyl disulfide, are added to shorten curing time, and accelerator activators, such as zinc oxide and stearic acid, serve to control the action of the accelerators. In addition to these chemical additives, reinforcing materials are often added to increase overall strength. Carbon black is used for this purpose. Many substances are added as non-reinforcing fillers for obtaining better processing properties and for lowering costs. Silica of greater than about 1 micron in diameter is a common inert filler or diluent. Silica of size less than about 1 micron may be used as a reinforcing filler material. "Hi-Sil-C" is precipitated silica having a particle size of about 0.03 micron diameter and having a surface area of about 120 square meters per gram, and hence is an example of this latter type. Other filler materials which may commonly be compounded in the mix include clay, talc, slate flour, infusorial earth, natural whiting, and barytes.

Most of the above filling and reinforcing additives improve the overall characteristics of the cured rubber but have little effect on the state of cure. The state of cure of vulcanized rubber is one of rubber's important characteristics.

A principal object of the invention is to provide a rubber curing composition and process which results in a high and increased state of cure. This high state of cure is shown by increased hardness, tensile strength and modulus, and lowered elongation, permanent set and compression set.

Other objects of the invention will in part be obvious and will in part appear hereinafter.

In the practice of the invention, the curing of rubber, natural and synthetic, during vulcanization is beneficially affected by the utilization of a rubber-containing composition which includes an organo-metallic compound having, as the metal component, a transition element and, as the organo component, two organic hydrocarbon residues each containing a five carbon ring, alicyclic in character, wherein a carbon atom is linked by single bonds to each of two carbon atoms which in turn are linked by double bonds to each of two other carbon atoms which are linked together by a single bond. This five carbon ring, alicyclic in character, which is present also in the organic compound from which the organic residue is derived has the following structure, hereinafter designated "alicyclic cyclopentadienyl carbon ring":

The alicyclic character of the ring structure is essential for purposes of this invention. For example, both cyclopentadiene and indene contain an alicyclic cyclopentadienyl carbon ring; cyclopentadiene having no double bond coordinately shared with an aromatic ring and indene having only one double bond of the cyclopentadienyl ring coordinately shared with an aromatic ring. In contrast, the five carbon ring in fluorene, where each of the double bonds in such ring is coordinately shared with an aromatic ring, is not alicyclic in character and fluorene thus does not contain an alicyclic cyclopentadienyl carbon ring.

Examples of organic compounds having the requisite alicyclic cyclopentadienyl carbon ring are cyclopentadiene, its aliphatic derivatives as for example methyl, ethyl, butyl, allyl and vinyl cyclopentadiene, and its aromatic derivatives as for example phenyl and benzyl cyclopentadiene, and indene and its comparable derivatives.

Compounds useful according to this invention may be represented by the general empirical formula:

$$R_2MX_z$$

wherein R represents an organic hydrocarbon residue containing an alicyclic cyclopentadienyl carbon ring, M is a transition element, X is halogen and $z$ is selected from the group consisting of 0, 1, 2 and 3.

It will be noted that in the above empirical formula, R is a hydrocarbon residue or radical of an organic compound, containing an alicyclic cyclopentadienyl carbon ring. The residue contains the same ring structure as the compound less one hydrogen atom on the methylene carbon atom.

Reference herein to "transition elements" means those elements of the periodic system characterized by atoms in which an inner $d$ level of electrons is present but not filled to capacity, namely Sc., Ti., V., Cr., Mn., Fe., Co., Ni., Y., Zr., Nb., Mo., Tc., Ru., Rh., Pd., La., Hf., Ta., W., Re., Os., Ir., Pt., and Ac., as well as the so-called inner transition elements comprising the rare earth of lanthanide series and the actinide series.

Particularly well adapted for purposes of this invention are organo-metallic compounds of the type described in which M in the above empirical formula is a transition element of the fourth period, viz., those elements having an atomic number 21–28 inclusive, namely, Sc., Ti., V., Cr., Mn., Fe., Co., and Ni. This group of the transition elements is characterized by having an inner 3d level which is partially occupied but is not filled to capacity. Consequently, this group of the transition elements may be designated the 3d orbital series of transition elements.

The transition element organo-metallic compounds may be prepared by formation of an alkali metal derivative of an organic compound containing the cyclopentadienyl carbon ring, and reaction of the resulting organo-alkali metal compound with a transition element halide as disclosed and claimed in the co-pending application of Maurice A. Lynch and John C. Brantley entitled "Process for Producing Organo-Metallic Compounds," Serial No. 381,970 and filed September 23, 1953. However, the process there disclosed and claimed forms no part of this invention.

As compounds that may be utilized, mention may be made of the following: bis(cyclopentadienyl)iron, $(C_5H_5)_2Fe$; bis(cyclopentadienyl)zirconium dichloride, $(C_5H_5)_2ZrCl_2$; bis(cyclopentadienyl)manganese, $(C_5H_5)_2Mn$ bis(cyclopentadienyl) chromium, $(C_5H_5)_2Cr$; bis(methylcyclopentadienyl)iron, $(CH_3C_5H_4)_2Fe$; bis(allylcyclopentadienyl) iron, $(CH_2=CHCH_2C_5H_4)_2Fe$; bis(indenyl)iron, $(C_9H_7)_2Fe$; bis(cyclopentadienyl)titanium dichloride, $(C_5H_5)_2TiCl_2$; bis(cyclopentadienyl)cobalt, $(C_5H_5)_2Co$; bis(cyclopentadienyl)vanadium dichloride, $(C_5H_5)_2VCl_2$, and bis(cyclopentadienyl)nickel, $(C_5H_5)_2Ni$ A compound selected from the group consisting of bis(cyclopentadienyl)iron, bis(cyclopentadienyl)titanium and bis(cyclopentadienyl)zirconium dichloride is particularly preferred for employment according to this invention.

The organo-metallic compounds may be utilized singly and in compatible admixture, and the amount thereof may vary in parts by weight per one hundred parts of rubber from about 0.1 to about 10, more particularly from about 0.15 to about 5.

As an illustrative embodiment of a manner in which the invention may be practiced, the following procedures are presented:

EXAMPLE I

Bis(cyclopentadienyl)iron, 1 g. was dissolved in 100 ml. ethylene glycol dimethyl ether. Two hundred grams of silica filler "Hi-Sil-C," which is precipitated silicon dioxide of fine particle size, were weighed out and placed in an "Osterizer" mixer. The glycol ether solution was then added and mixing continued until a homogeneous mixture was obtained. The mixture was then placed in an evaporating dish and the solvent allowed to evaporate. Microscopic examination of the dried material showed no signs of crystals although the mass had a greenish tinge. This material containing 0.5 wt.-percent bis(cyclopentadienyl) iron was added to a GRS–1000 compound in the proportion of 35 parts per 100 parts GRS, the composition of the mix being:

| | Parts by weight |
|---|---|
| GRS 1000 | 100.0 |
| Silica filler ("Hi-Sil-C") | 35.0 |
| Bis(cyclopentadienyl) iron | 0.175 |
| Zinc oxide | 5.0 |
| Stearic acid | 1.5 |
| Sulfur | 2.0 |
| "Altax" | 1.75 |

The "GRS 1000" is a synthetic rubber produced from a mixture of 75% butadiene and 25% styrene, and the "Altax" is a cure accelerator which is benzothiazyl disulfide. Portions of the mix were cured at 292° F. for 45 minutes and 90 minutes.

EXAMPLE II

A control mix was prepared identical in composition with that in Example I except that the bis(cyclopentadienyl) iron was omitted. Portions were cured as in Example I. The cured rubber produced from the bis(cyclopentadienyl)iron-containing mix (Ex. I) demonstrated a higher state of cure than that obtained in the control where the cyclopentadienyl compound was not used (Ex. II). The results are summarized in Table 1.

*Table 1*

| | Ex. II Control | | Ex. I Bis(Cyclopentadienyl) Iron Additive as 0.175 Wt.-Percent on Rubber | |
|---|---|---|---|---|
| Cure at 292° F | 45 min. | 90 min. | 45 min. | 90 min. |
| 300% Modulus, p.s.i | 120 | 140 | 200 | 220 |
| Tensile Strength,[1] p.s.i | 1,450 | 1,910 | 1,660 | 1,925 |
| Elongation,[1] Percent | 1,015 | 865 | 985 | 805 |
| Hardness | 39–30 | 44–39 | 44–36 | 49–44 |
| Set at Break, Percent | 49 | 30 | 49 | 30 |
| Compression Set B, Percent (A.S.T.M. D359 22 hrs/70° C.) | | 32.8 | | 31.5 |
| Permanent Set, Percent (A.S.T.M. D412) | 13 | 9 | 9 | 6 |

[1] Value at break.

EXAMPLE III

The procedure of Example I is followed using a mix as therein described except that the "Hi-Sil-C" contained 0.5 wt.-percent of bis(cyclopentadienyl)titanium dichloride in lieu of bis(cyclopentadienyl)iron.

EXAMPLE IV

The procedure of Example I is followed using a mix as therein described which includes "Hi-Sil-C" containing 0.5 wt.-percent of bis(cyclopentadienyl)zirconium dichloride in lieu of bis(cyclopentadienyl)iron.

EXAMPLES V–VII

The following base formula was used:

| | Parts by weight |
|---|---|
| GRS 1000 | 100.0 |
| Silica filler ("Hi-Sil-C") | 35.0 |
| Zinc oxide | 5.0 |
| Sulfur | 2.0 |
| "Altax" | 1.75 |

Organo-metallic compounds were added to the silica filler in an amount equivalent to 0.5 weight-percent on the filler as described in Example I. There thus resulted compositions containing per 100 parts of GRS in the base formula, 0.175 part of the following organo-metallic compounds:

| Example No.: | Organo-metallic compound |
|---|---|
| V | $(C_5H_5)_2Fe$ |
| VI | $(C_5H_5)_2ZrCl_2$ |
| VII | $(C_5H_5)_2TiCl_2$ |

Each of the above mixes was vulcanized for 90 minutes at 292° F.

EXAMPLE VIII

The foregoing base formula without any additive was vulcanized at 292° F. for 90 minutes.

Comparison of the stress-strain data of the foregoing examples follows:

STRESS-STRAIN DATA; CURE 90 MINUTES AT 292° F.

Table 2a

| Ex. | Additives | Stress Lb./Sq. In. at Indicated Percent Elongation | | | | | |
|---|---|---|---|---|---|---|---|
| | | 200 | 400 | 500 | 600 | 700 | 800 |
| VIII | None | 130 | 190 | 210 | 310 | 435 | 635 |
| II | Stearic Acid | 90 | 210 | 310 | 500 | 850 | 1,440 |
| I | $(C_5H_5)_2$ Fe plus stearic acid | 175 | 325 | 475 | 710 | 1,190 | |
| III | $(C_5H_5)_2$ ZrCl$_2$ plus stearic acid | 150 | 240 | 350 | 530 | 920 | 1,560 |
| IV | $(C_5H_5)_2$ TiCl$_2$ plus stearic acid | 150 | 270 | 390 | 510 | 850 | 1,360 |
| V | $(C_5H_5)_2$ Fe | 150 | 290 | 350 | 480 | 720 | 970 |
| VI | $(C_5H_5)_2$ ZrCl$_2$ | 120 | 220 | 280 | 360 | 470 | 710 |
| VII | $(C_5H_5)_2$ TiCl$_2$ | 170 | 220 | 260 | 340 | 440 | 660 |

Table 2b

| Ex. | Additives | Percent Increase in 500% Modulus | Tensile at Break, Lb./Sq. In. | Elong. at Break, Percent |
|---|---|---|---|---|
| VIII | None | | 1,560 | 1,035 |
| II | Stearic Acid | 148 | 1,910 | 867 |
| I | $(C_5H_5)_2$ Fe plus stearic acid | 226 | 1,925 | 805 |
| III | $(C_5H_5)_2$ ZrCl$_2$ plus stearic acid | 167 | 2,040 | 853 |
| IV | $(C_5H_5)_2$ TiCl$_2$ plus stearic acid | 186 | 1,820 | 870 |
| V | $(C_5H_5)_2$ Fe | 167 | 2,050 | 985 |
| VI | $(C_5H_5)_2$ ZrCl$_2$ | 133 | 1,700 | 1,047 |
| VII | $(C_5H_5)_2$ TiCl$_2$ | 124 | 1,900 | 1,140 |

Others of the organo-metallic compounds containing a transition element as the metal component, as e.g. manganese, cobalt, vanadium, chromium and nickel compounds of cyclopentadiene and indene, may be utilized in a similar manner with corresponding relative advantage. These compounds are suitably and often preferably introduced into the rubber as coatings on a filler, e.g. the silica filler. However, it will be understood that other methods may be utilized for introducing the organo-metallic compounds into the rubber formulation. For example, the organo-metallic compound may be dispersed in the mix by simple mixing or by admixture in desired proportions with components of the mix other than filler.

Since certain changes may be made in carrying out the above process without departing from the scope of the invention, it is intended that all matter contained in the above description shall be interpreted as illustrative and not in a limiting sense.

This application is a continuation-in-part of my application S.N. 548,752, filed November 23, 1955 now abandoned.

Having described my invention, what I claim as new and desire to secure by Letters Patent is:

1. A composition for the production of rubber goods which comprises a sulfur-vulcanizable rubber and an organo-metallic compound having the empirical formula:

$$R_2MCl_z$$

wherein R is an organic hydrocarbon residue containing an alicyclic cyclopentadienyl carbon ring, M is a transition element, and z is selected from the group consisting of 0, 1, 2 and 3, the organo-metallic compound being present in an amount from about 0.1% to about 10% by weight of the rubber.

2. A composition as defined in claim 1, in which the transition element is a 3d orbital series transition element.
3. A composition as defined in claim 1, in which R is a cyclopentadienyl radical.
4. A composiiton as defined in claim 1, in which R is a hydrocarbon radical-substituted cyclopentadienyl radical.
5. A composition as defined in claim 1, in which R is a methylcyclopentadienyl radical.
6. A composition as defined in claim 1, in which R is an allylcyclopentadienyl radical.
7. A composition as defined in claim 1, in which R is a benzylcyclopentadienyl radical.
8. In a method for the production of rubber goods from a sulfur-vulcanizable rubber mix containing a sulfur vulcanization accelerator, the improvement comprising incorporating into said vulcanizable rubber mix an organo-metallic compound having the empirical formula:

$$R_2MCl_z$$

wherein R is an organic hydrocarbon residue containing an alicyclic cyclopentadienyl carbon ring, M is a transition element, and z is selected from the group consisting of 0, 1, 2 and 3.

9. The method defined in claim 8 wherein M is a 3d orbital series transition element.
10. In a method for the production of rubber goods from a sulfur-vulcanizable rubber mix containing a sulfur vulcanization accelerator, the improvement comprising incorporating into said vulcanizable rubber mix a compound selected from the group consisting of bis(cyclopentadienyl) iron, bis(cyclopentadienyl)titanium dichloride, and bis(cyclopentadienyl)zirconium dichloride.
11. In a method for the production of rubber goods from a sulfur-vulcanizable rubber mix containing a sulfur vulcanization accelerator, the improvement comprising incorporating a sulfur-curable rubber compounding material having a coating of bis(cyclopentadienyl)iron into the vulcanizable rubber mix.
12. In a method for the production of rubber goods from a sulfur-vulcanizable rubber mix containing a sulfur vulcanization accelerator, the improvement comprising incorporating silica having a coating of bis(cyclopentadienyl)iron into the vulcanizable rubber mix.
13. A sulfur-vulcanizable rubber-containing composition characterized by containing between about 0.1% and about 10% by weight based on the rubber of an organo-metallic compound selected from the group consisting of bis(cyclopentadienyl)iron, bis(cyclopentadienyl)titanium dichloride and bis(cyclopentadienyl)zirconium dichloride.
14. A sulfur-vulcanizable rubber-containing composition characterized by containing between about 0.1% and about 10% by weight based on the rubber of bis(cyclopentadienyl)iron.
15. A sulfur vulcanizable rubber-containing composition characterized by containing between about 0.1% and about 10% by weight based on the rubber of an organo-metallic compound having the empirical formula:

$$R_2MCl_z$$

wherein R is an organic hydrocarbon residue containing an alicyclic cyclopentadienyl carbon ring, M is a transition element of the 3d orbital series and z is selected from the group consisting of 0, 1, 2, and 3.

16. A composition for the production of rubber goods which comprises a butadiene-styrene copolymer synthetic rubber, sulfur, a vulcanization accelerator, a silica filler and between about 0.1% and 10% by weight based on the rubber of an organo-metallic compound having the empirical formula:

$$R_2MCl_z$$

wherein R is an organic hydrocarbon residue containing an alicyclic cyclopentadienyl carbon ring, M is a transition element of the $3d$ orbital series and $z$ is selected from the group consisting of 0, 1, 2 and 3.

17. A composition for the production of rubber goods which comprises a butadiene-styrene copolymer synthetic rubber, sulfur, a vulcanization accelerator, a carbon black filler and between about 0.1% and 10% by weight based on the rubber of an organo-metallic compound having the empirical formula:

$$R_2MCl_z$$

wherein R is an organic hydrocarbon residue containing an alicyclic cyclopentadienyl carbon ring, M is a transition element of the $3d$ orbital series and $z$ is selected from the group consisting of 0, 1, 2 and 3.

No references cited.